United States Patent
Tsubaki

(10) Patent No.: US 10,589,780 B2
(45) Date of Patent: Mar. 17, 2020

(54) ELECTRIC POWER STEERING APPARATUS

(71) Applicant: NSK LTD., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/327,606

(22) PCT Filed: Nov. 1, 2017

(86) PCT No.: PCT/JP2017/039584
§ 371 (c)(1),
(2) Date: Feb. 22, 2019

(87) PCT Pub. No.: WO2018/084190
PCT Pub. Date: May 11, 2018

(65) Prior Publication Data
US 2019/0256133 A1 Aug. 22, 2019

(30) Foreign Application Priority Data

Nov. 7, 2016 (JP) .................................. 2016-217410
Nov. 7, 2016 (JP) .................................. 2016-217411

(51) Int. Cl.
*B62D 6/00* (2006.01)
*B62D 15/02* (2006.01)
*B62D 5/04* (2006.01)

(52) U.S. Cl.
CPC ........... *B62D 6/008* (2013.01); *B62D 5/0409* (2013.01); *B62D 5/0463* (2013.01); *B62D 15/0215* (2013.01)

(58) Field of Classification Search
USPC ......................................................... 701/41
See application file for complete search history.

(56) References Cited

U.S. PATENT DOCUMENTS

| 6,161,068 | A | 12/2000 | Kurishige et al. |
| 2004/0210365 | A1* | 10/2004 | Tanaka ................. B62D 5/0409 |
| | | | 701/41 |

(Continued)

FOREIGN PATENT DOCUMENTS

| JP | 2000-168600 A | 6/2000 |
| JP | 2002-104210 A | 4/2002 |

(Continued)

OTHER PUBLICATIONS

International Search Report for PCT/JP2017/039584 dated, Jan. 30, 2018 (PCT/ISA/210).

(Continued)

*Primary Examiner* — Tyler D Paige
(74) *Attorney, Agent, or Firm* — Sughrue Mion, PLLC

(57) ABSTRACT

[Problem]
An object of the present invention is to provide an electric power steering apparatus that easily obtains equivalent steering torques to vehicle driving information such as a steering angle without being affected by a road surface state and aging-changes of mechanism characteristics of a steering system.
[Means for Solving the Problem]
The electric power steering apparatus that assist-controls a steering system, comprises: a target steering torque generating section to generate a target steering torque based on vehicle driving information, a converting section to convert the target steering torque into a target torsional angle, and a torsional angle control section to calculate the current command value based on the target torsional angle, a torsional angle of the torsion bar and a motor angular velocity; and the torsional angle control section comprises a torsional angle feedback compensating section to output a target torsional angular velocity corresponding to a deviation between the target torsional angle and the torsional angle, a velocity (Continued)

control section to output the current command value based on the target torsional angular velocity, and a stabilization compensating section to perform feedback to the current command value by setting a transfer function to at least one of angle relation information.

22 Claims, 12 Drawing Sheets

(56) References Cited

U.S. PATENT DOCUMENTS

| | | | |
|---|---|---|---|
| 2006/0086560 A1* | 4/2006 | Furusho | B62D 5/0463 |
| | | | 180/446 |
| 2017/0217479 A1 | 8/2017 | Tsubaki | |
| 2017/0232997 A1 | 8/2017 | Tsubaki et al. | |
| 2019/0002019 A1* | 1/2019 | Tsubaki | B62D 5/0463 |

FOREIGN PATENT DOCUMENTS

| | | |
|---|---|---|
| JP | 2011-131629 A | 7/2011 |
| JP | 5208894 B2 | 6/2013 |
| JP | 2014-31120 A | 2/2014 |
| JP | 2014-65492 A | 4/2014 |
| WO | 2016/027663 A1 | 2/2016 |
| WO | 2016/072143 A1 | 5/2016 |

OTHER PUBLICATIONS

International Preliminary Report on Patentability for PCT/JP2017/039584 dated Oct. 30, 2018 (PCT/IPEA/409).

* cited by examiner

ELECTRIC POWER STEERING APPARATUS

CROSS REFERENCE TO RELATED APPLICATIONS

This application is a National Stage of International Application No. PCT/JP2017/039584 filed Nov. 1, 2017, claiming priority based on Japanese Patent Application No. 2016-217410, filed Nov. 7, 2016 and Japanese Patent Application No. 2016-217411, filed Nov. 7, 2016

TECHNICAL FIELD

The present invention relates to a high-performance electric power steering apparatus that obtains a desired steering torque by performing control so that a torsional angle of a torsion bar which is provided in a column shaft (a steering shaft, or a handle shaft) follows a value depending on vehicle driving information such as a steering angle, a vehicle speed and a steering state, and maintains the desired steering torque without being affected by a road surface state and aging-changes of mechanism system characteristics.

BACKGROUND ART

An electric power steering apparatus (EPS) exists as an apparatus equipped with a motor control unit. The electric power steering apparatus which provides a steering system of a vehicle with an assist torque (a steering assist torque) by means of a rotational torque of a motor, and applies a driving force of the motor which is controlled by using an electric power supplied from an inverter as the assist torque to a steering shaft or a rack shaft by means of a transmission mechanism including a reduction mechanism. In order to accurately generate the assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through a reduction mechanism 3, universal joints 4a and 4b, a rack-and-pinion mechanism 5, and tie rods 6a and 6b, further via hub units 7a and 7b. In addition, a torque sensor 10 for detecting a steering torque Ts of the steering wheel 1 and a steering angle sensor 14 for detecting a steering angle θh are provided in the column shaft 2 having a torsion bar, and a motor 20 for assisting a steering force of the steering wheel 1 is connected to the column shaft 2 through the reduction mechanism 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) based on the steering torque Ts detected by the torque sensor 10 and a vehicle speed Vs detected by a vehicle speed sensor 12, and controls a current supplied to the motor 20 for the EPS by means of a voltage control command value Vref obtained by performing compensation or the like to the current command value.

A controller area network (CAN) 40 exchanging various information of a vehicle is connected to the control unit 30, and it is possible to receive the vehicle speed Vs from the CAN 40. Further, it is also possible to connect a non-CAN 41 exchanging a communication, analog/digital signals, a radio wave or the like except for the CAN 40 to the control unit 30.

The control unit 30 mainly comprises a central processing unit (CPU) (including a micro controller unit (MCU), a micro processor unit (MPU) and so on), and general functions performed by programs within the CPU are shown in FIG. 2.

The control unit 30 will be described with reference to FIG. 2. As shown in FIG. 2, the steering torque Ts detected by the torque sensor 10 and the vehicle speed Vs detected by the vehicle speed sensor 12 (or from the CAN 40) are inputted into a current command value calculating section 31 that calculates a current command value Iref1. The current command value calculating section 31 calculates the current command value Iref1 that is a control target value of a current supplied to the motor 20 based on the inputted steering torque Ts and vehicle speed Vs and by using an assist map or the like. The current command value Iref1 is inputted into a current limiting section 33 through an adding section 32A. A current command value Irefm whose maximum current is limited is inputted into a subtracting section 32B, and a deviation I (=Irefm−Im) between the current command value Irefm and a motor current Im being fed back is calculated. The deviation I is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37. The motor current Im of the motor 20 is detected by a motor current detector 38 and is fed back to the subtracting section 32B.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 34-3 and an inertia 34-2 at an adding section 34-4, further adds the added result at the adding section 34-4 with a convergence 34-1 at an adding section 34-5, and then outputs the added result at the adding section 34-5 as the compensation signal CM.

Thus, in a conventional assist control, the steering torque (the torsional torque of the torsion bar) applied by a manual input of a driver is detected by a torque sensor, and the motor current is controlled as the assist current mainly depending on the detected steering torque. However, in this method, different steering torques can be generated depending on the steering angle due to a difference of a road surface state (for example, a tilt of the road surface). Moreover, different steering characteristics are obtained depending on variations of a motor output characteristic due to the long-term use.

The apparatus disclosed in, for example, Japanese Patent No. 5208894 (Patent Document 1) is shown as a vehicle control unit to resolve the above problems. The apparatus of Patent Document 1 comprises a steering angle detecting means, a target setting means, and a control means to perform control so as to achieve a target value of a steering torque which is set by the target setting means, so as to apply an appropriate steering torque based on a tactile characteristic of a driver.

THE LIST OF PRIOR ART DOCUMENTS

Patent Documents

Patent Document 1: Japanese Patent No. 5208894 B2

SUMMARY OF THE INVENTION

Problems to be Solved by the Invention

However, in the apparatus of Patent Document 1, it is required that a relationship between the steering angle and the steering torque is preliminarily obtained based on a relationship between the steering angle or the steering torque and a tactile amount (a grip force). Complicated operation that the steering torque corresponding to the steering angle is set as the target value based on the former relationship, occurs. Further, the apparatus of Patent Document 1 uses PI-control to a deviation between the target value of the steering torque and the detected steering torque.

The present invention has been developed in view of the above-described circumstances, and an object of the present invention is to provide an electric power steering apparatus that easily obtains equivalent steering torques to vehicle driving information such as a steering angle without being affected by a road surface state and aging-changes of mechanism characteristics of a steering system.

Means for Solving the Problems

The present invention relates to an electric power steering apparatus that comprises a torsion bar which is provided in a column shaft of a steering wheel of a vehicle, and assist-controls a steering system by driving and controlling a motor connected to the column shaft based on a current command value, the above-described object of the present invention is achieved by that comprising: a target steering torque generating section to generate a target steering torque based on vehicle driving information, a converting section to convert the target steering torque into a target torsional angle, and a torsional angle control section to calculate the current command value based on the target torsional angle, a torsional angle of the torsion bar and a motor angular velocity; wherein the torsional angle control section comprises a torsional angle feedback compensating section to output a target torsional angular velocity corresponding to a deviation between the target torsional angle and the torsional angle, a velocity control section to output the current command value based on the target torsional angular velocity, and a stabilization compensating section to perform feedback to the current command value by setting a transfer function to at least one of angle relation information; and wherein the electric power steering apparatus performs a control so that the torsional angle follows a value depending on the vehicle driving information.

The above-described object of the present invention is efficiently achieved by that wherein the angle relation information includes the motor angular velocity, and wherein the stabilization compensating section performs feedback to the current command value by setting a transfer function to the motor angular velocity; or wherein the transfer function is set by a primary high pass filter (HPF) and again; or wherein the angle relation information includes the torsional angle, the motor angular velocity and a column angle, and wherein the stabilization compensating section performs feedback to the current command value by setting respective transfer functions to the torsional angle, the motor angular velocity and the column angle; or wherein the transfer function to the motor angular velocity is set by a primary HPF and a gain, the transfer function to the torsional angle is set by a second or higher order filter, and the transfer function to the column angle is set by a second or higher order filter; or wherein the target steering torque generating section comprises a basic map to output a first torque signal being vehicle speed sensitive, depending on the vehicle driving information, a phase compensating section disposed at a previous stage or a subsequent stage of the basic map, and an output section to output the first torque signal or the first torque signal through the phase compensating section as the target steering torque; or wherein a steering state which indicates right-turning or left-turning of the steering wheel is inputted into the target steering torque generating section, wherein the target steering torque generating section further comprises a hysteresis correcting section to perform hysteresis correction to the vehicle driving information depending on the steering state and output a second torque signal, and wherein the output section outputs the target steering torque by adding the second torque signal to the first torque signal; or wherein the target steering torque generating section further comprises a damper gain section to output a third torque signal obtained by multiplying a differential value of the vehicle driving information by a vehicle speed sensitive damper gain, and wherein the output section outputs the target steering torque by adding the second torque signal and the third torque signal to the first torque signal; or wherein a limiter which limits upper and lower limit values is disposed at a subsequent stage of the velocity control section; or wherein the torsional angle feedback compensating section uses a gain value of a transfer function; or wherein the vehicle driving information includes a steering angle, a vehicle speed and a steering state.

Effects of the Invention

According to the electric power steering apparatus of the present invention, by generating the target torsional angle from the vehicle driving information such as the vehicle speed and the steering angle and controlling the torsional angular velocity by using the result obtained by multiplying a deviation between the target torsional angle and the detected torsional angle by the compensation value (the transfer function) as the target torsional angular velocity, the torsional angle can be operated so as to follow the target torsional angle, a desired steering torque corresponding to the vehicle driving information such as the steering angle can be obtained, and an appropriate steering torque based on steering feeling of a driver can be applied. The torsional angle control section comprises the velocity control section to control the torsional angular velocity. Thereby, followability to the target torsional angle can be improved. Moreover, an affection to the torsional angle due to a change of the steering angle inputted from the driver can be suppressed, and the followability of the torsional angle to the target torsional angle against abrupt steering can be improved.

Since the stabilization compensating section that has the transfer function (the second order filter, the fourth order filter or the like) which is required for the stabilization against the angle relation information, is provided, stabilization of the overall EPS control system can be achieved.

Simply increasing the gain in order to make the torsional angle follow the target torsional angle, causes an oscillation or a vibration. However, the oscillation and the vibration can be suppressed by the feedback of the signal generated by the stabilization compensating section. The generation of the vibration which is generated in a high frequency band can be suppressed by providing the stabilization compensating section. Consequently, the gain of the torsional angle feedback compensating section can increase, and the followability to the command value can also be improved.

MODE FOR CARRYING OUT THE INVENTION

The present invention is an electric power steering apparatus to obtain an equivalent steering torque corresponding to vehicle driving information such as a steering angle, a vehicle speed and a steering state without an influence of a road surface state, and obtains a desired steering torque by performing control so that a torsional angle of a torsion bar provided in a column shaft follows a value depending on the vehicle driving information. A counter measure of oscillation phenomena is performed by providing a stabilization compensating section to improve a stability of a system.

Thereby, a gain can be adjusted so as to enhance followability to a target value. Consequently, the followability can be improved.

Embodiments of the present invention will be described with reference to the accompanying drawings.

Figure 1:
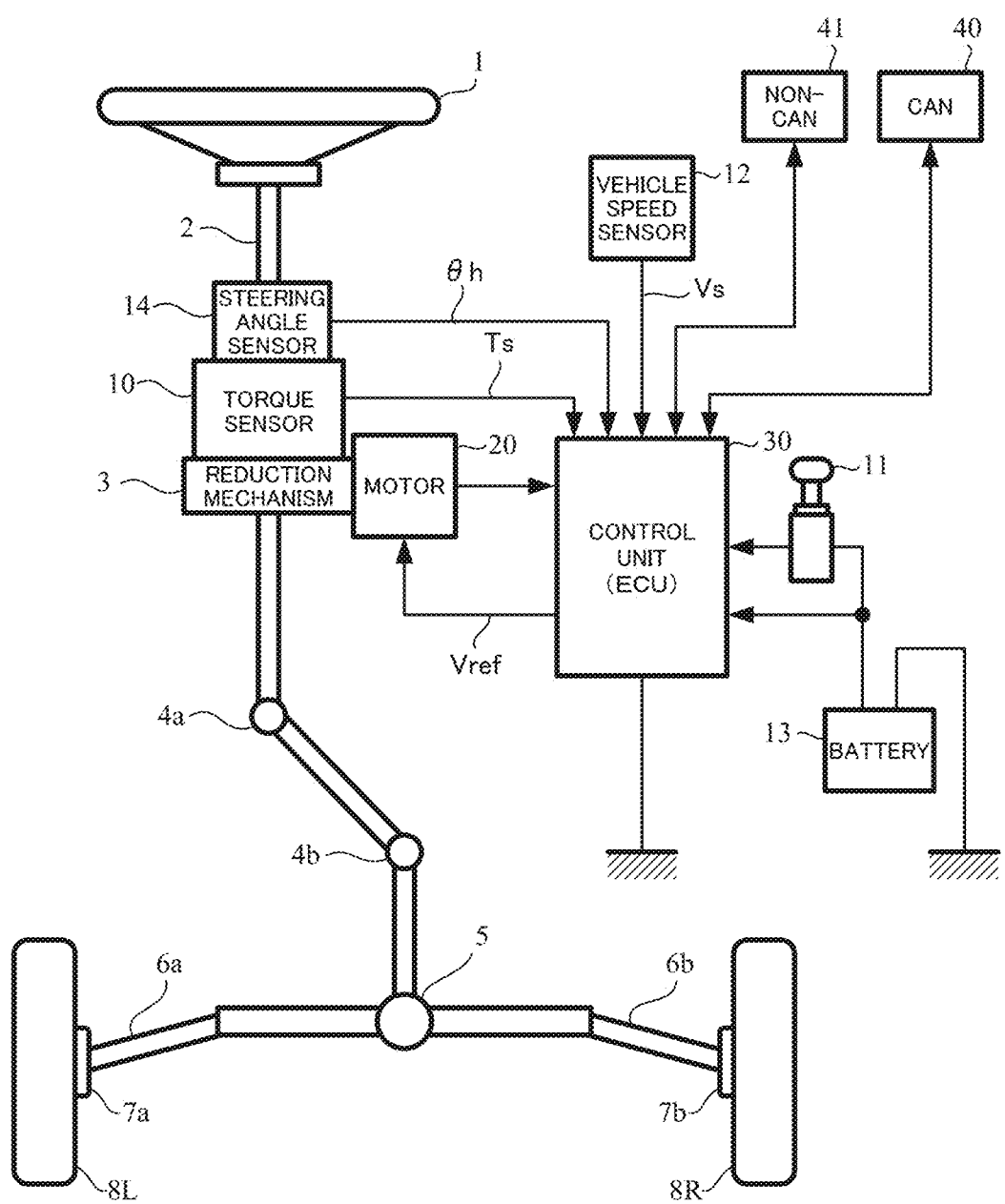
FIG. 1 is a configuration diagram illustrating a general outline of a conventional electric power steering apparatus (EPS)
Figure 2:
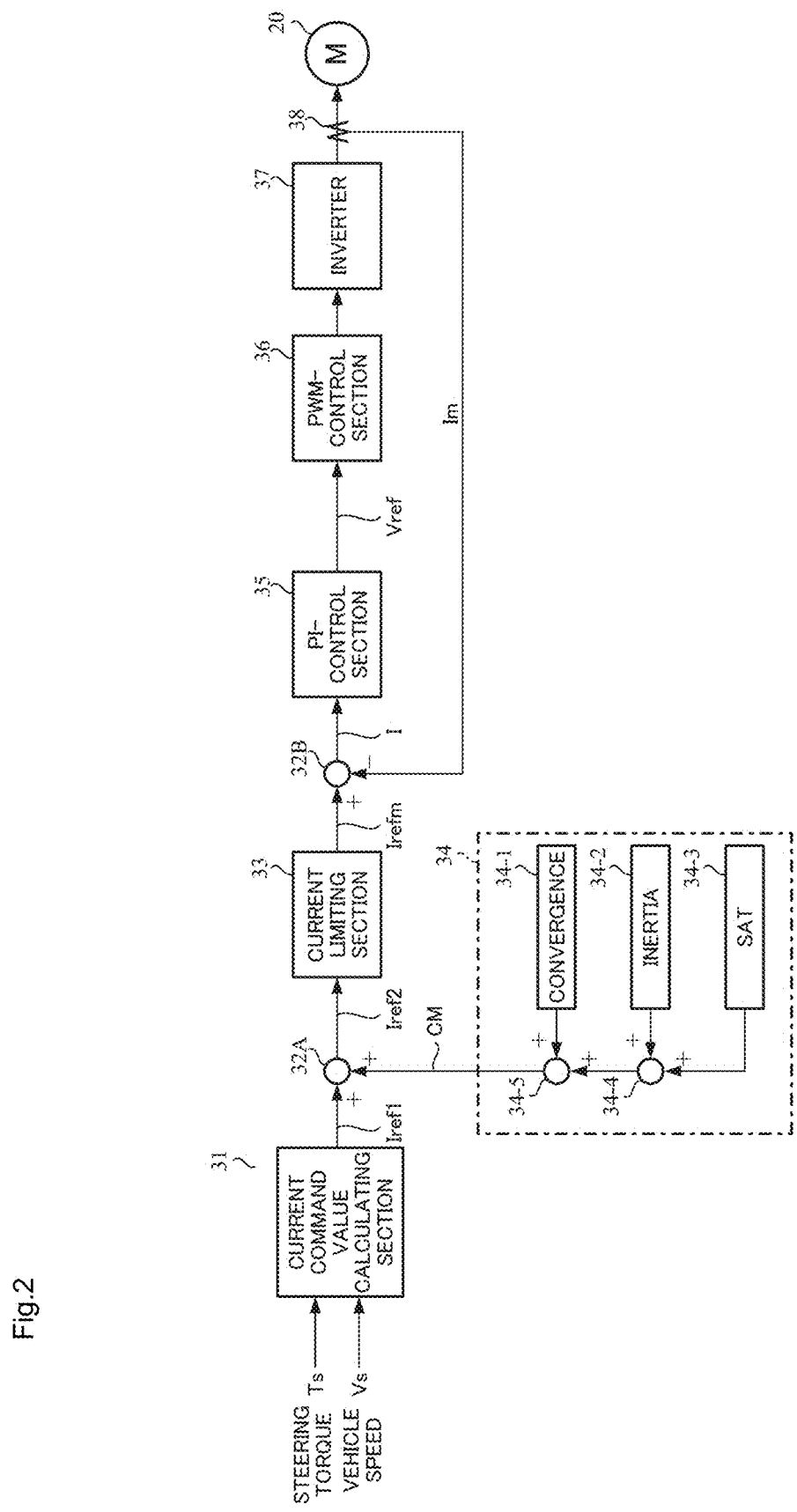
FIG. 2 is a block diagram showing a configuration example of a control unit (ECU) of the electric power steering apparatus.
Figure 3:
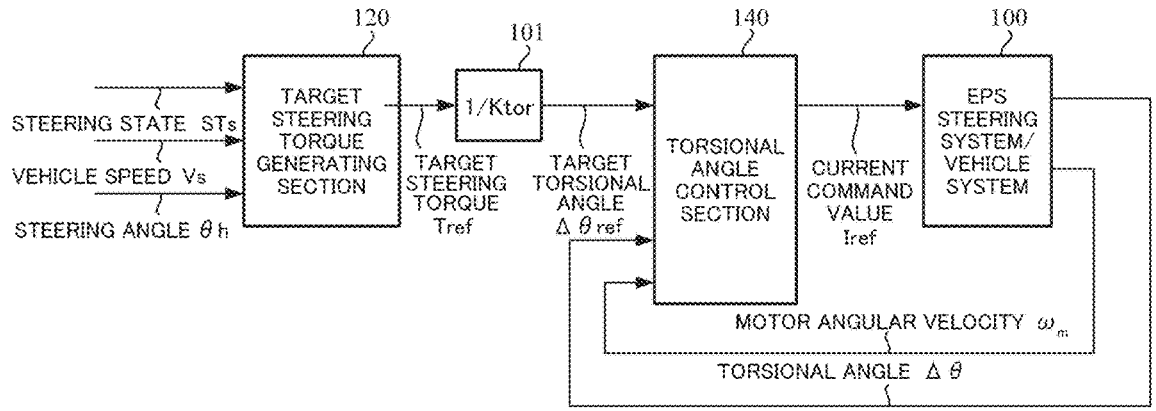
FIG. 3 is a block diagram showing a basic configuration example (a first embodiment) of the present invention.

FIG. 3 is a block diagram showing a basic configuration example (a first embodiment) of the present invention, and steering of a driver is assist-controlled by a motor in an EPS steering system/vehicle system 100. A steering state STs indicating right-turning or left-turning of the steering, a vehicle speed Vs and a steering angle θh, which are vehicle driving information, are inputted into a target steering torque generating section 120 that outputs a target steering torque $T_{ref}$ depending on the vehicle driving information such as the steering angle θh. The target steering torque $T_{ref}$ generated by the target steering torque generating section 120 is converted into a target torsional angle $\Delta\theta_{ref}$ at a converting section 101 having a characteristic of "$1/K_{tor}$" in the case that a spring constant of the torsion bar 2A provided in the column shaft 2 is defined as $K_{tor}$. The target torsional angle $\Delta\theta_{ref}$ is inputted into a torsional angle control section 140. The target torsional angle $\Delta\theta_{ref}$, the torsional angle $\Delta\theta$ and a motor angular velocity $\omega_m$ are inputted into the torsional angle control section 140, and the torsional angle control section 140 calculates a current command value $I_{ref}$ so that the torsional angle $\Delta\theta$ becomes the target torsional angle $\Delta\theta_{ref}$. The motor of the EPS is driven by the current command value $I_{ref}$.

Figure 4:
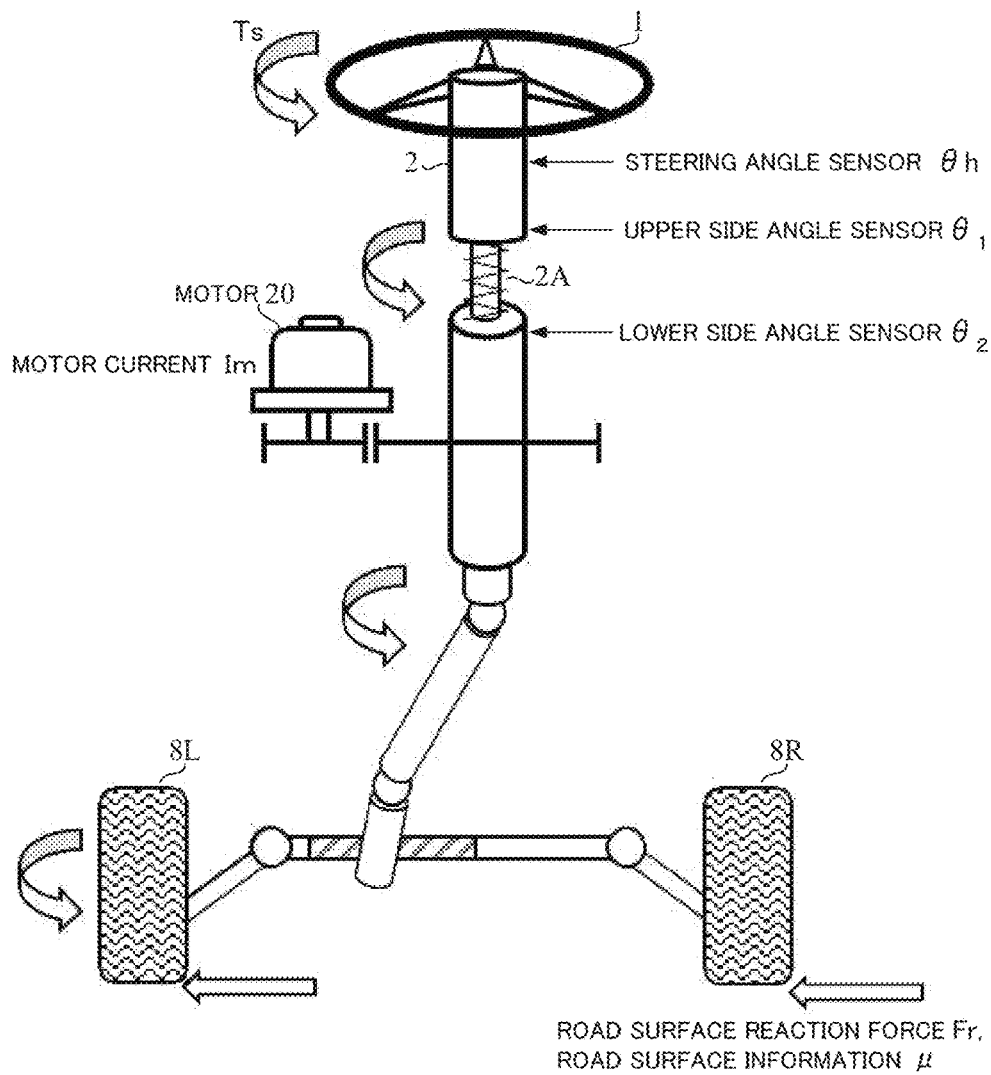
FIG. 4 is a structural diagram showing an installation example of an EPS steering system and various sensors.

An installation example of the EPS steering system and various sensors is shown in FIG. 4, and the torsion bar 2A is provided in the column shaft 2. Road surface reaction force Fr and road surface information p operate on steered wheels 8L and 8R. An upper side angle sensor (an angle $\theta_1$) is disposed at a steering wheel side of the column shaft 2 above the torsion bar 2A, and a lower side angle sensor (an angle $\theta_2$) is disposed at a steered wheel side of the column shaft 2 below the torsion bar 2A. The steering angle θh is detected by a steering angle sensor disposed at an upper portion of the column shaft 2. The torsion bar torsional angle $\Delta\theta$ and the torsion bar torque Tt can be calculated by the following expressions 1 and 2 from a deviation between the angle $\theta_1$ of the upper side angle sensor and the angle $\theta_2$ of the lower side angle sensor. In the expression 2, $K_{tor}$ is a spring constant of the torsion bar 2A.

$$\theta_1 - \theta_2 = \Delta\theta \qquad \text{[Expression 1]}$$

$$K_{tor} \cdot \Delta\theta = K_{tor} \cdot (\theta_1 - \theta_2) = Tt \qquad \text{[Expression 2]}$$

Figure 5:
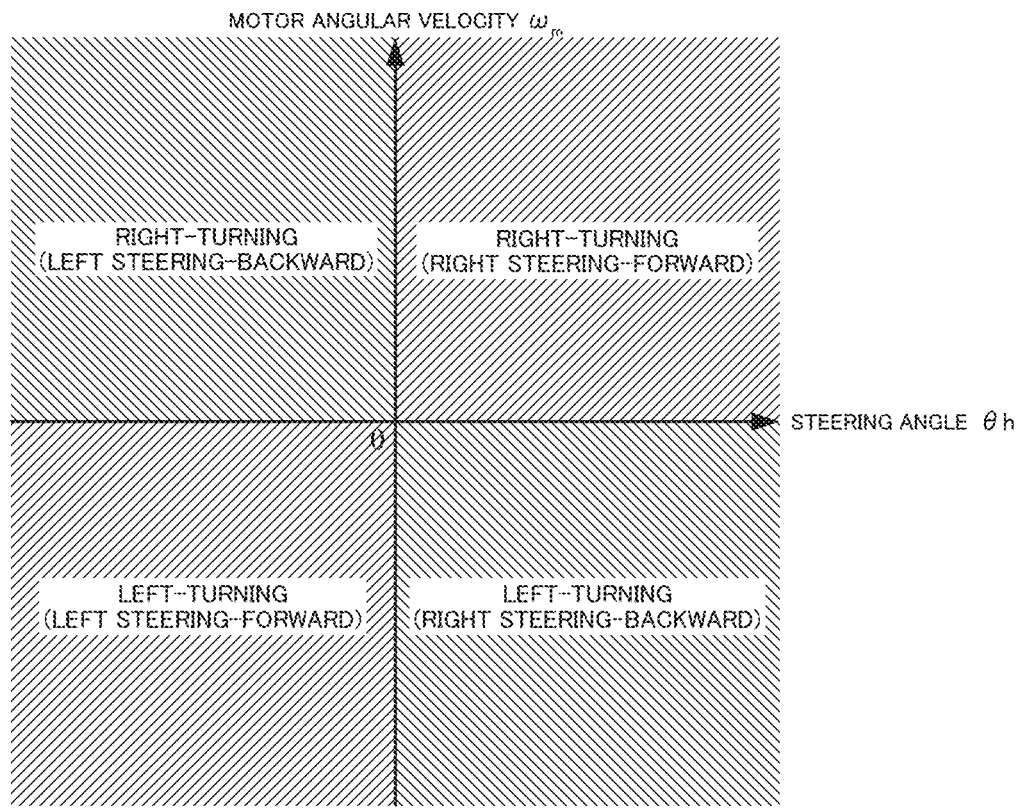
FIG. 5 is a graph for explaining right-turning and left-turning of steering.

The torsion bar torque Tt can be detected by using, for example, the torque sensor disclosed in Japanese Unexamined Patent Publication No. 2008-216172 A. The steering state STs of right-turning or left-turning of the steering can be obtained by using, for example, a relationship between the steering angle θh and the motor angular velocity $\omega_m$ as shown in FIG. 5.

In such a configuration, an operating example of the present embodiment will be described with reference to a flowchart of FIG. 6.

At first, the steering angle θh, the steering state STs and the vehicle speed Vs are inputted into the target steering torque generating section 120 (Step S1), and the target steering torque generating section 120 generates the target steering torque $T_{ref}$ (Step S10). The target steering torque $T_{ref}$ is inputted into the converting section 101, and the converting section 101 converts the target steering torque $T_{ref}$ into the target torsional angle $\Delta\theta_{ref}$ (Step S30). The target torsional angle $\Delta\theta_{ref}$, the torsional angle $\Delta\theta$ and the motor angular velocity $\omega_m$ are inputted into the torsional angle control section 140 (Step S31). The torsional angle control section 140 calculates the current command value $I_{ref}$ so that the torsional angle $\Delta\theta$ follows the target torsional angle $\Delta\theta_{ref}$ (Step S40), drives the motor based on the current command value $I_{ref}$, and performs current control (Step S60).

Figure 6:
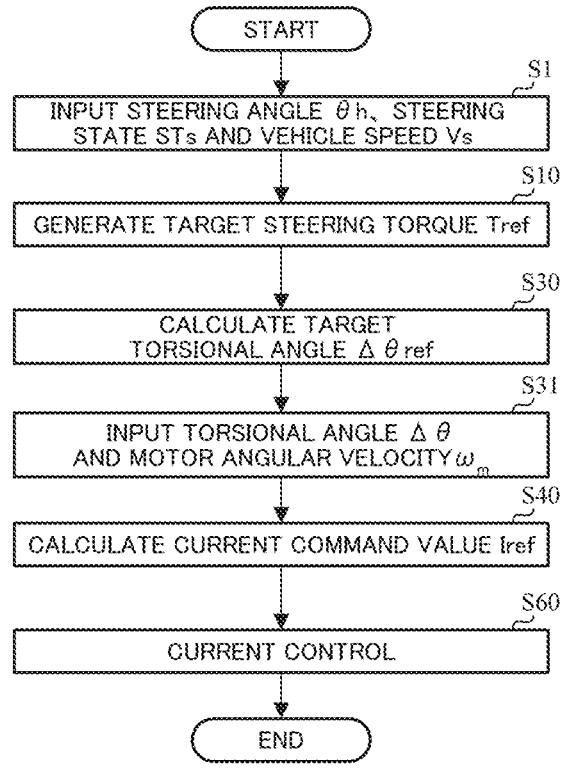
FIG. 6 is a flowchart showing a basic operating example (the first embodiment) of the present invention.

An input order of the data in FIG. 6 is appropriately changeable.

Figure 7:
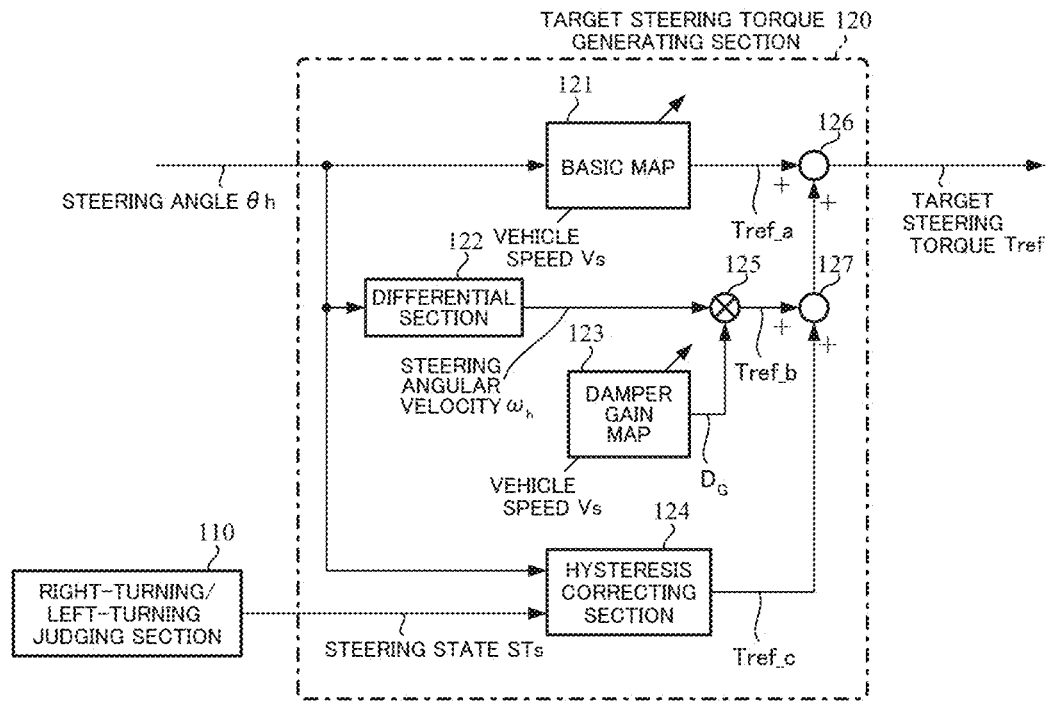
FIG. 7 is a block diagram showing a configuration example of a target steering torque generating section.
Figure 8:
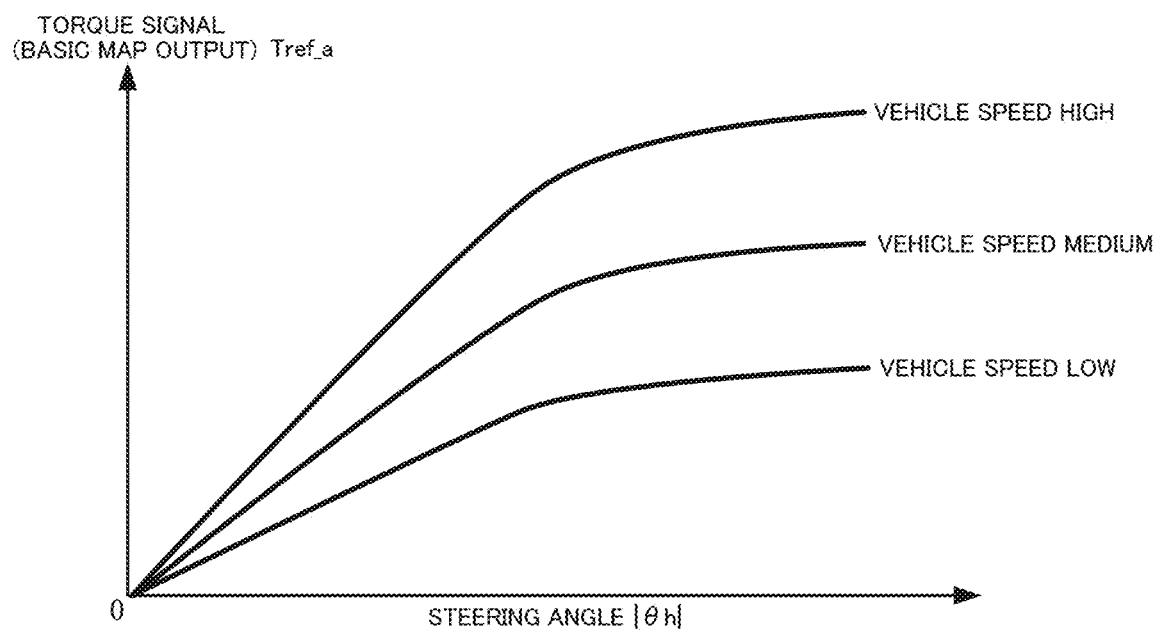
FIG. 8 is a graph showing a characteristic example of a basic map.

FIG. 7 shows a configuration example of the target steering torque generating section 120, and the steering angle $\theta$h is inputted into a basic map 121, a differential section 122 and a hysteresis correcting section 124. The basic map 121 outputs a torque signal $T_{ref\_a}$ whose parameter is the vehicle speed Vs as shown in FIG. 8. In FIG. 8, the basic map 121 is configured by using an absolute value |$\theta$h| of the steering angle $\theta$h. Alternatively, the basic map 121 may output the torque signal $T_{ref\_a}$ depending on the positive value or the negative value of the steering angle $\theta$h. The torque signal $T_{ref\_a}$ is inputted into an adding section 126.

Figure 9:
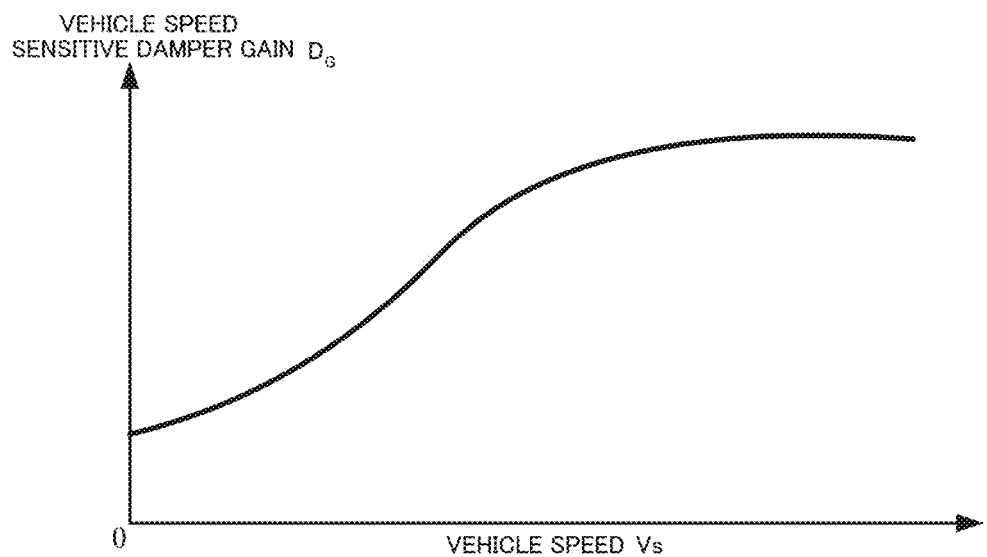
FIG. 9 is a graph showing a characteristic example of a vehicle speed sensitive damper gain map.

The steering angular velocity $\omega_h$ which is obtained by differentiating the steering angle $\theta$h is outputted from a differential section 122, and the steering angular velocity $\omega_h$ is inputted into a multiplying section 125. A vehicle speed sensitive damper gain $D_G$ is inputted into the multiplying section 125. A torque signal $T_{ref\_b}$ which is a multiplied result (=$D_G \cdot \omega_h$) is inputted into an adding section 127. The vehicle speed sensitive damper gain $D_G$ is outputted from a damper gain map 123 being vehicle speed sensitive, depending on the vehicle speed Vs. For example, as shown in FIG. 9, the vehicle speed sensitive damper gain $D_G$ has a characteristic where the value gradually increases when the vehicle speed Vs is higher. A damper gain section comprises the damper gain map 123 and the multiplying section 125.

A right-turning/left-turning judging section 110 performs a judgment, for example, as shown in FIG. 5. The steering state STs which is a judgment result is inputted into the hysteresis correcting section 124. The steering angle $\theta$h is also inputted into the hysteresis correcting section 124, and the hysteresis correcting section 124 calculates a torque signal $T_{ref\_c}$ based on the steering angle $\theta$h and the steering state STs in accordance with the following expression 3. In the following expression 3, x and y are set to $\theta$h and $T_{ref\_c}$, respectively (x=$\theta$h and y=$T_{ref\_c}$).

when right-turning $y=A_{hys}[1-\exp\{-a(x-b)\}]$ when left-turning $y=-A_{hys}[1-\exp\{a(x-b)\}]$ [Expression 3]

Figure 10:
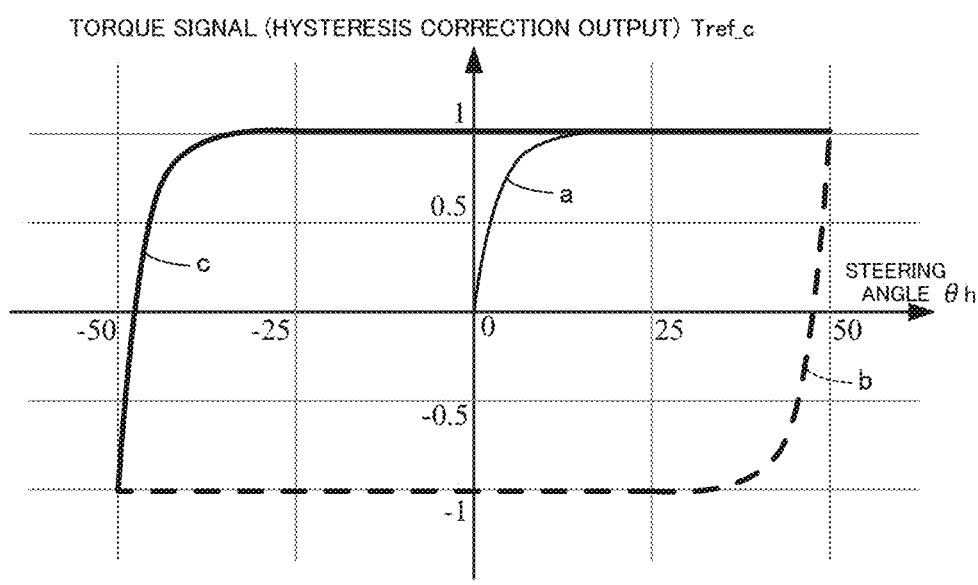
FIG. 10 is a graph showing a characteristic example of a hysteresis correcting section.

When switching from the right-turning steering to the left-turning steering and when switching from the left-turning steering to the right-turning steering, a value "b" of the following expression 4 is substituted into the value "b" of the expression 3 after switching, based on the coordinates (x1, y1) just before switching. Thereby, continuity when switching the steering is maintained.

when right-turning $b = x_1 + \frac{1}{a}\log_e\left(1 - \frac{y_1}{A_{hys}}\right)$ [Expression 4]

when left-turning $b = x_1 - \frac{1}{a}\log_e\left(1 + \frac{y_1}{A_{hys}}\right)$ Setting $A_{hys}$=1 [Nm] and a=0.3 in the expressions 3 and 4, in the case that an initial angle of the steering wheel is 0 [deg] and the steering wheel is steered between +50 [deg] and −50 [deg], a changing example of the torque signal $T_{ref\_c}$ which the hysteresis correction is applied to is shown in FIG. 10. That is, the torque signal $T_{ref\_c}$ from the hysteresis correcting section 124 has a hysteresis characteristic shown by "an origin point->a (the thin line)->b (the broken line)->c (the bold line)".

In such a configuration, an operating example of the target steering torque generating section 120 (the step S10 in FIG. 6) will be described with reference to a flowchart of FIG. 11.

At first, the steering angle $\theta$h and the vehicle speed Vs are inputted into the basic map 121 (Step S11), and the basic map 121 generates and outputs the torque signal $T_{ref\_a}$ depending on the steering angle $\theta$h and the vehicle speed Vs in accordance with the characteristic shown in FIG. 8 (Step S12). The steering angle $\theta$h is also inputted into the differential section 122 and the hysteresis correcting section 124. The differential section 122 differentiates the steering angle $\theta$h and outputs the steering angular velocity $\omega_h$ (Step S13). The damper gain map 123 outputs the vehicle speed sensitive damper gain $D_G$ depending on the vehicle speed Vs (Step S14). The multiplying section 125 multiplies the steering angular velocity $\omega_h$ by the vehicle speed sensitive damper gain $D_G$, and outputs the torque signal $T_{ref\_b}$. The torque signal $T_{ref\_b}$ is inputted into the adding section 127 (Step S15).

The right-turning/left-turning judging section 110 judges the right-turning or the left-turning, and the steering state STs being the judged result is inputted into the hysteresis correcting section 124 (Step S16). The hysteresis correcting section 124 performs the hysteresis correction corresponding to the steering angle $\theta$h by the calculations of the expressions 3 and 4 depending on the steering state STs (Step S17), and generates the torque signal $T_{ref\_c}$ (Step S18). The torque signal $T_{ref}$C is inputted into the adding section 127.

The torque signals $T_{ref\_a}$, $T_{ref\_b}$ and $T_{ref\_c}$ obtained as described above, are added at the adding sections 126 and 127 by which the output section is constituted, and the target steering torque $T_{ref}$ is calculated (Step S19). That is, the torque signals $T_{ref\_b}$ and $T_{ref\_c}$ are added at the adding section 127, the torque signal $T_{ref\_a}$ is added to the added result at the adding section 126, and the added result at the adding section 126 is outputted as the target steering torque $T_{ref}$.

Figure 11:
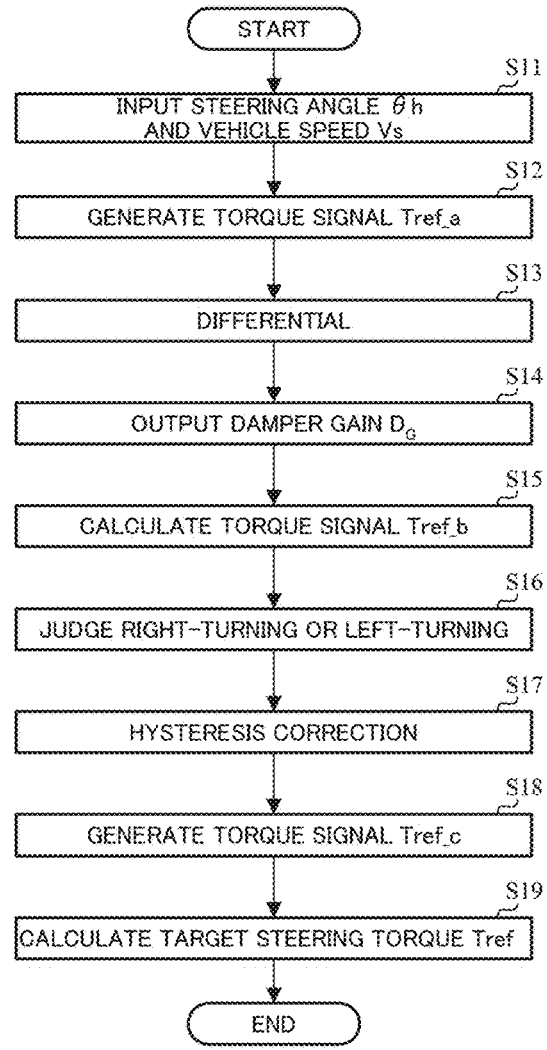
FIG. 11 is a flowchart showing an operating example of the target steering torque generating section.

The orders of the data input, the calculation and the like in FIG. 11 are appropriately changeable.

Figure 12:
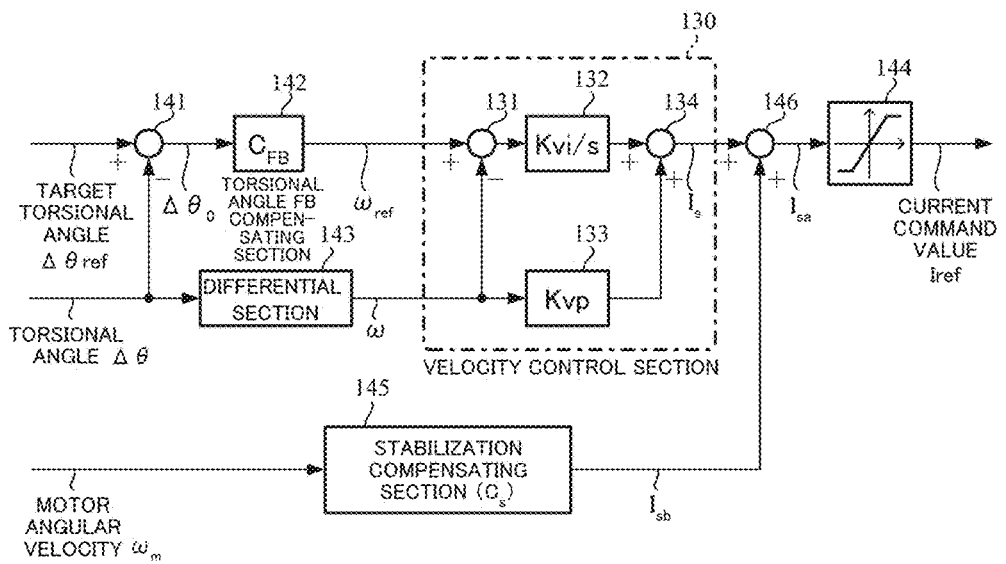
FIG. 12 is a block diagram showing a configuration example (the first embodiment) of a torsional angle control section.

FIG. 12 is a block diagram showing a configuration example of the torsional angle control section 140, a deviation $\Delta\theta_0$ between the target torsional angle $\Delta\theta_{ref}$ and the torsional angle $\Delta\theta$ is calculated at a subtracting section 141, and the deviation $\Delta\theta_0$ is inputted into a torsional angle feedback (FB) compensating section 142 having a compensation value $C_{FB}$ (a transfer function). The torsional angle FB compensating section 142 multiplies the deviation $\Delta\theta_0$ by the compensation value $C_{FB}$ (the transfer function), and outputs a target torsional angular velocity $\omega_{ref}$ so that the torsional angle $\Delta\theta$ follows the target torsional angle $\Delta\theta_{ref}$. The target torsional angular velocity $\omega_{ref}$ is inputted into a velocity control section 130 which performs a proportional preceding type PI-control (an I-P control). The compensation value $C_{FB}$ may be a simple gain $K_{pp}$, or may be a compensation value of a PI-control or the like.

The torsional angle $\Delta\theta$ is also inputted into a differential section 143, and the differential section 143 outputs a torsional angular velocity $\omega$ obtained by differentiating the torsional angle $\Delta\theta$. The torsional angular velocity $\omega$ is inputted into the velocity control section 130.

The velocity control section 130 which performs the I-P control calculates a current command value "Is" so that the torsional angular velocity ω follows the target torsional angular velocity $ω_{ref}$. The current command value "Is" is inputted into an adding section 146.

The motor angular velocity $ω_m$ is inputted into the stabilization compensating section 145 having a compensation value Cs (a transfer function) as the angle relation information. In the case that the gains of the torsional angle FB compensating section 142 and the velocity control section 130 increase in order to improve the followability and a disturbance characteristic, a regulative oscillation phenomenon in a high frequency band occurs. As the countermeasure, the transfer function (Cs) which is required for the stabilization is set for the motor angular velocity $ω_m$ at the stabilization compensating section 145. Thereby, the stabilization of the overall EPS control system can be achieved. As the transfer function (Cs) of the stabilization compensating section 145, for example, the primary filter which is set by a pseudo differential and a gain and is represented by the following expression 5, is used. The pseudo differential uses a primary high pass filter (HPF) structure.

$$C_s = K_{sta} \frac{\frac{1}{2\pi f_c} s}{\frac{1}{2\pi f_c} s + 1} \qquad \text{[Expression 5]}$$

Here, $K_{sta}$ is the gain, and fc is a cutoff frequency. The fc, for example, is set to 150 [Hz].

The current command value "Is" from the velocity control section 130 and the current command value Isb from the stabilization compensating section 145 are added at the adding section 146. A limiter 144 which limits the upper and lower limit values of the current command value Isa obtained by the above addition and outputs the current command value $I_{ref}$, is disposed.

Figure 13:
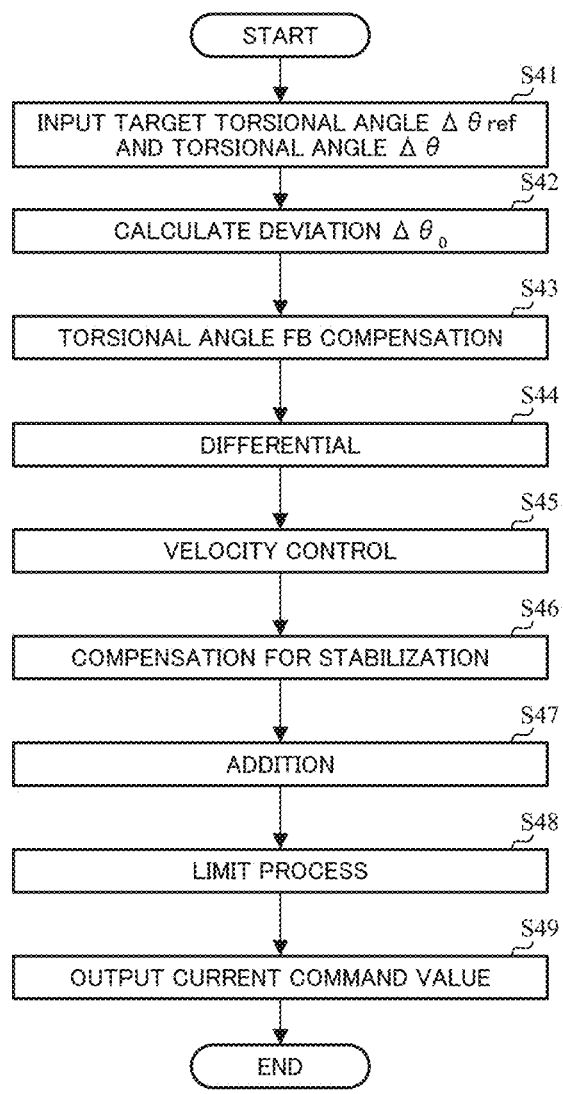
FIG. 13 is a flowchart showing an operating example (the first embodiment) of the torsional angle control section.

In such a configuration, an operating example of the torsional angle control section 140 (the step S40 in FIG. 6) will be described with reference to a flowchart of FIG. 13.

At first, the target torsional angle $Δθ_{ref}$ and the torsional angle Δθ are inputted (Step S41). The deviation $Δθ_0$ is calculated at the subtracting section 141 (Step S42). The deviation $Δθ_0$ is inputted into the torsional angle FB compensating section 142, and is compensated (Step S43). The compensated target torsional angular velocity $ω_{ref}$ is inputted into the velocity control section 130. The torsional angle Δθ is inputted also into the differential section 143, and the differential section 143 differentiates the torsional angle Δθ and outputs the torsional angular velocity ω (Step S44). The torsional angular velocity ω is also inputted into the velocity control section 130.

In the velocity control section 130, a difference between the target torsional angular velocity $ω_{ref}$ and the torsional angular velocity ω is obtained at the subtracting section 131. The difference is integrated (Kvi/s) at the integral section 132, and the integrated result is inputted into the adding section 134 (Step S45). A proportional process (Kvp) is performed to the torsional angular velocity ω at the proportional section 133, and the proportional-processed result is inputted into the adding section 134 (Step S45). The current command value "Is" which is the added result is outputted from the adding section 134 and is inputted into the adding section 146.

The motor angular velocity $ω_m$ is inputted into the stabilization compensating section 145, and the compensation for the stabilization is performed to the motor angular velocity $ω_m$ at the stabilization compensating section 145 (Step S46). The current command value Isb from the stabilization compensating section 145 is inputted into the adding section 146. The current command values "Is" and Isb are added at the adding section 146 (Step S47). The current command value Isa which is the added result is inputted into the limiter 144, and the limiter 144 limits the upper and lower limit values of the current command value Isa (Step S48). The current command value $I_{ref}$ for the motor control is outputted from the limiter 144 (Step S49).

Effects of the present embodiment (the first embodiment) will be described.

At first, an effect of the stabilization compensating section 145 will be described by using simulation results in the case that the torsional angle control section 140 is used.

Figure 14A:
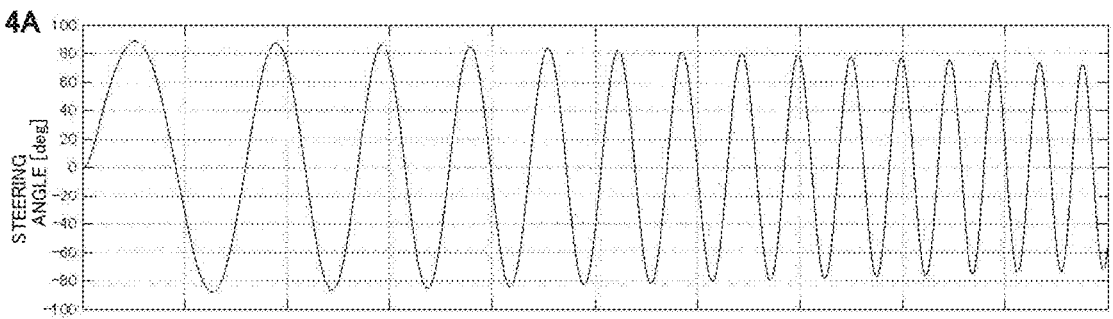
FIGS. 14A and 14B are simulation results in the case that a stabilization compensating section is not used.
Figure 14B:
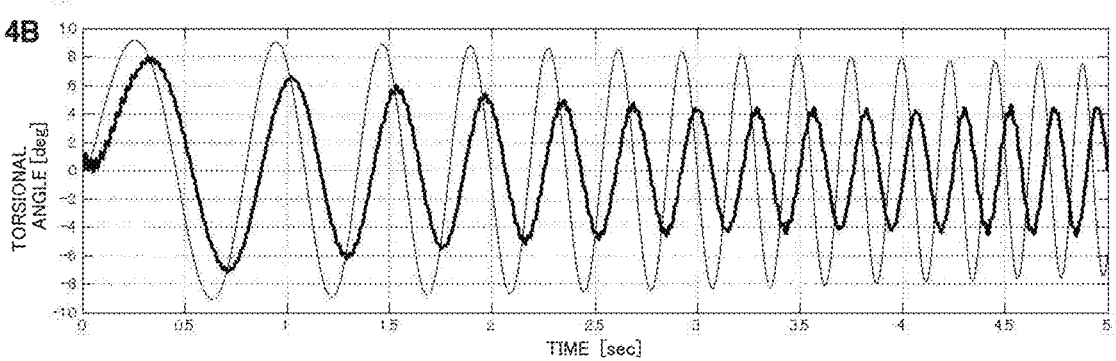
Figure 15A:
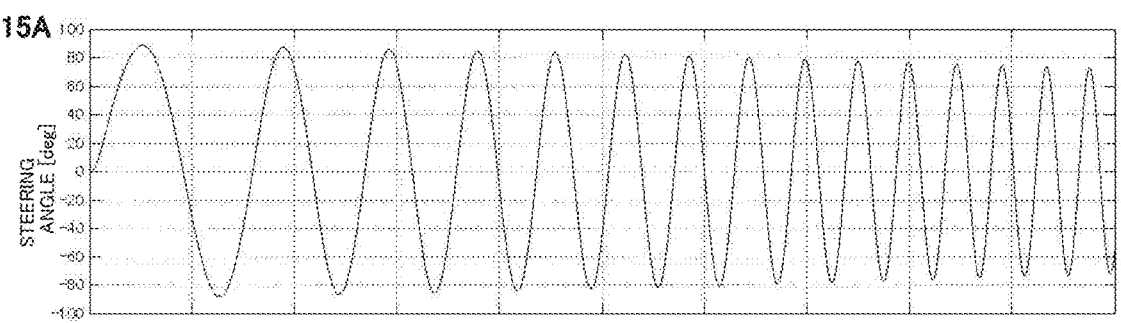
FIGS. 15A and 15B are simulation results in the case that the stabilization compensating section is used.
Figure 15B:
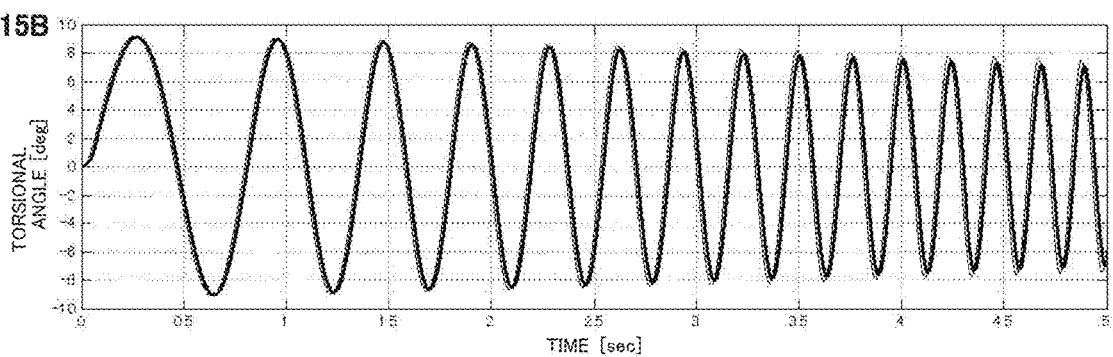

In order to intelligibly show the effect of the stabilization compensating section 145, assuming that a signal of a torque sensor (a torsional angle sensor) is a signal whose change rate is slow, a primary low pass filter (LPF) whose cutoff frequency is 50 [Hz] is intentionally applied to the signal, and the simulation is performed by feeding back the filtered signal to the torsional angle control section 140. The simulation results are shown in FIGS. 14A, 14B, 15A and 15B. FIGS. 14A and 14B show the results in the case that the stabilization compensating section 145 is not used. FIGS. 15A and 15B show the results in the case that the stabilization compensating section 145 is used. FIGS. 14A and 15A show a time change of the steering angle θh, and FIGS. 14B and 15B show time changes of the target torsional angle $Δθ_{ref}$ (or the target steering torque) (the thin line) and the torsional angle Δθ (or the steering torque) (the bold line), respectively. In the case that the stabilization compensating section 145 is not used, when the gains of the torsional angle FB compensating section 142 and the velocity control section 130 increase, as shown in FIG. 14B, the torsional angle Δθ vibrationally changes to the time, and does not follow the target torsional angle $Δθ_{ref}$. On the contrary, in the case that the stabilization compensating section 145 is used, as shown in FIG. 15B, the thin line is substantially coincident with the bold line, the generation of the vibration is suppressed, and the gains of the torsional angle FB compensating section 142 and the velocity control section 130 can sufficiently increase. Consequently, the followability to the target value can be improved.

Next, an effect of the damper gain map 123 will be described by using simulation results.

Figure 16A:
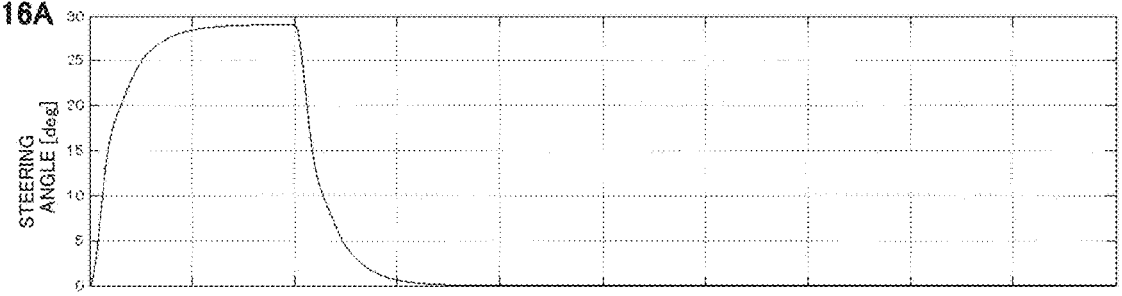
FIGS. 16A and 16B are simulation results in the case that the damper gain map is used.
Figure 16B:
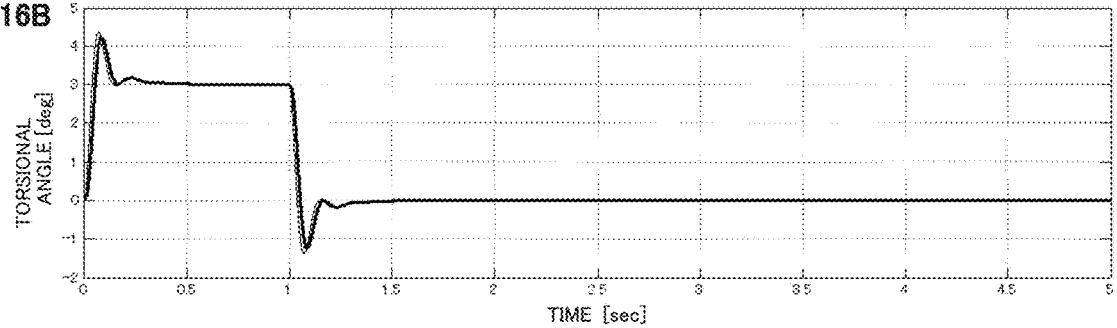

Having viscous feeling as the steering feeling, and having convergence without oscillating a steering wheel and improving the system stability in the case of changing from a state where the steering wheel is steered to a state where a driver releases the steering wheel, by compensating the target steering torque proportional to the steering angular velocity, are exemplified as an effect of the vehicle speed sensitive damper gain map 123. The simulation is performed for confirming the above effects. The simulation with reference to releasing the steering wheel is performed by maintaining a state where the manual input with 3 [Nm] is applied for 1 [sec] from a start (the steering angle θh is substantially 30 [deg]), and changing the steering torque to 0 [Nm] in a stepwise manner. The result is shown in FIGS. 16A and 16B. As well as FIGS. 14A, 14B, 15A and 15B, FIG. 16A shows a time change of the steering angle θh, and FIG. 16B shows time changes of the target torsional angle $Δθ_{ref}$ (the thin line) and the torsional angle Δθ (the bold line).

Figure 17A:
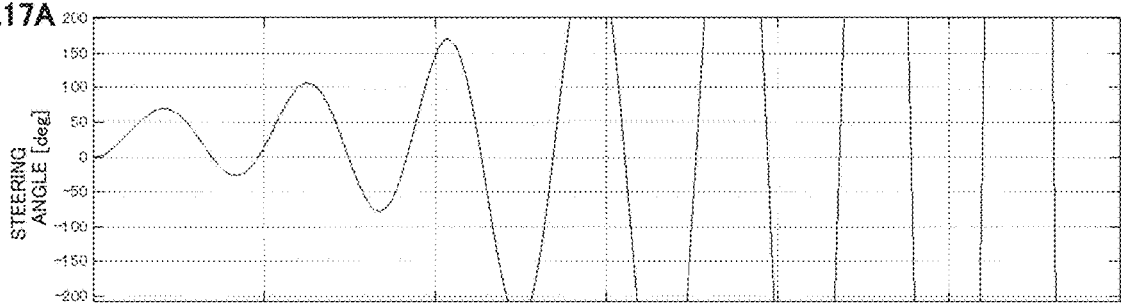
FIGS. 17A and 17B are simulation results in the case that the damper gain map is not used.
Figure 17B:
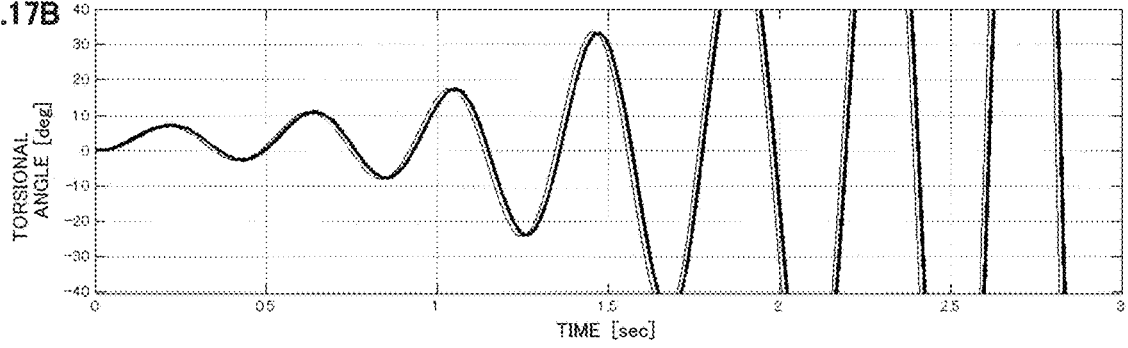

As shown in FIGS. 16A and 16B, it is understood that the steering angle θh stably converges to 0 [deg]. In the case that the damper gain map 123 is not used, the simulation result is shown in FIGS. 17A and 17B. In this case, as shown in FIGS. 17A and 17B, the results of the steering angle θh and the torsional angle Δθ can be oscillated in a regulative way.

Another embodiment (a second embodiment) of the present invention will be described.

In the first embodiment, the motor angular velocity $\omega_m$ is used as the angle relation information, the stabilization compensating section 145 to the motor angular velocity m, is disposed, and then the stabilization of the overall EPS control system is achieved. In the second embodiment, the motor angular velocity $\omega_m$, the torsional angle Δθ and the column angle θc are used as the angle relation information, and respective stabilization compensating sections to the torsional angle Δθ, the motor angular velocity $\omega_m$ and the column angle θc are disposed.

Figure 18:
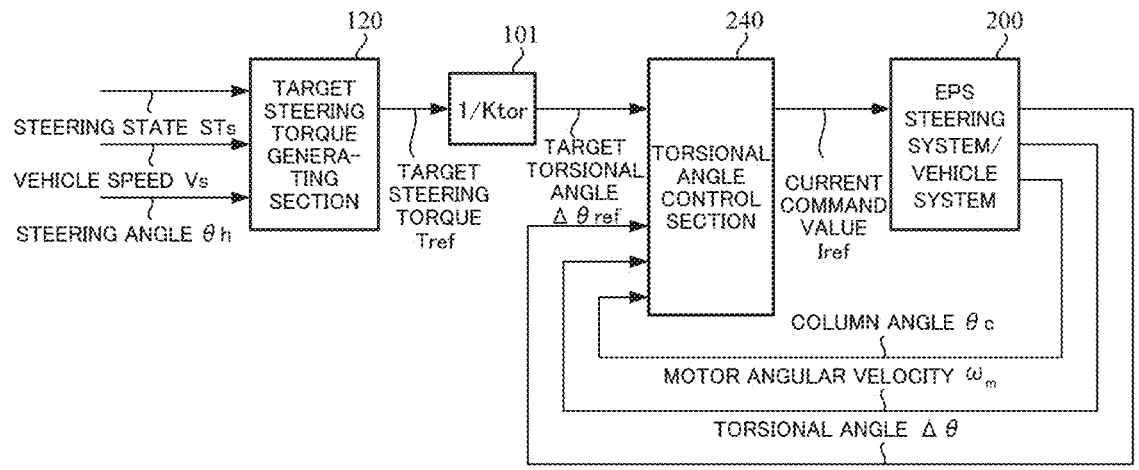
FIG. 18 is a block diagram showing a basic configuration example (a second embodiment) of the present invention.

FIG. 18 is a block diagram showing a basic configuration example of the second embodiment. Compared with the basic configuration example of the first embodiment shown in FIG. 3, the column angle θc in addition to the torsional angle Δθ and the motor angular velocity $\omega_m$ are outputted from the EPS steering system/vehicle system 200, and the column angle θc is inputted into a torsional angle control section 240. The other configurations are the same as those in the first embodiment. Compared with the operating example of the first embodiment shown in FIG. 6, in an operation of the present configuration example, the target torsional angle $\Delta\theta_{ref}$, the torsional angle Δθ, the motor angular velocity $\omega_m$ and the column angle θc are inputted into the torsional angle control section 240 in the step S31, so that an operation of the torsional angle control section in the step 40 is different.

Figure 19:
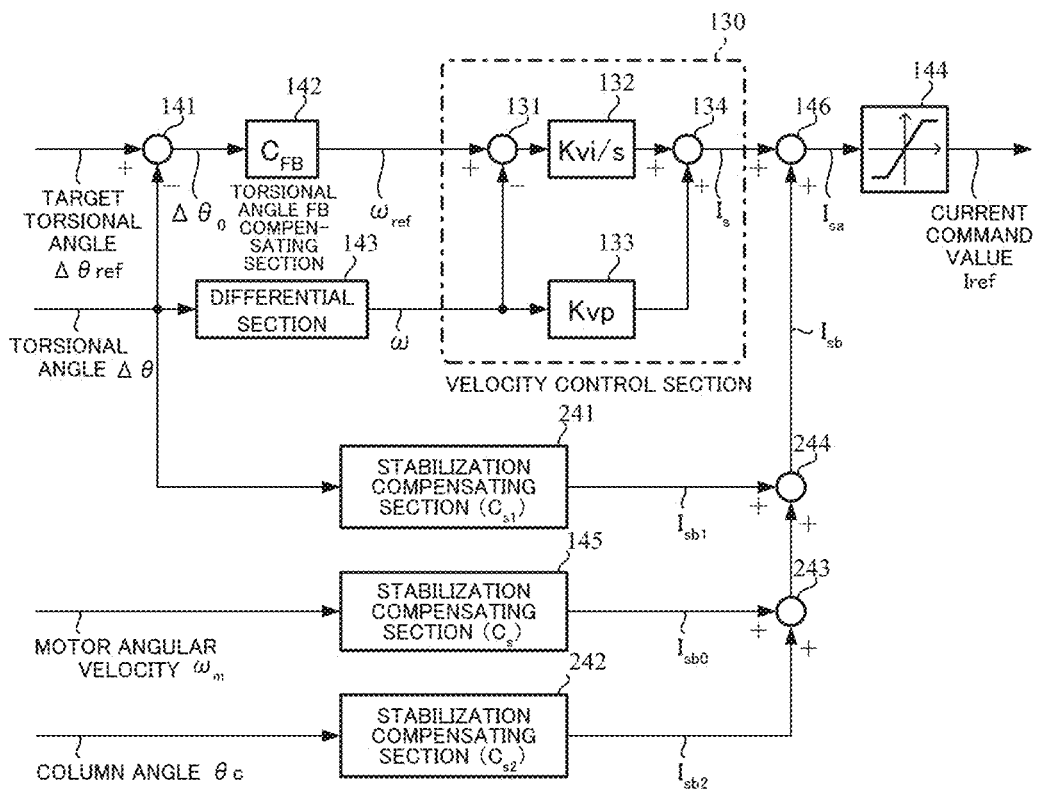
FIG. 19 is a block diagram showing a configuration example (the second embodiment) of a torsional angle control section.

A configuration example of the torsional angle control section 240 is shown in FIG. 19. Compared with the configuration example of the torsional angle control section 140 in the first embodiment shown in FIG. 12, stabilization compensating sections 241 and 242 and adding sections 243 and 244 are added. The other configurations are the same as those in the first embodiment, and the explanation is omitted.

The torsional angle Δθ is inputted into the stabilization compensating section 241 having a compensation value Cs1 (a transfer function), and a current command value Isb1 from the stabilization compensating section 241 is inputted into the adding section 244. The column angle θc is inputted into the stabilization compensating section 242 having a compensation value Cs2 (a transfer function), and a current command value Isb2 from the stabilization compensating section 242 is inputted into the adding section 243. A current command value Isb0 from the stabilization compensating section 145 (which is corresponding to the current command value Isb in the first embodiment) and the current command value Isb2 are added at the adding section 243. Moreover, the current command value Isb1 is added to the added result at the adding section 244, and the added result at the adding section 244 is outputted as the current command value Isb to the adding section 146. The second order filter represented by the following expression 6 is, for example, independently used as the transfer functions (Cs1 and Cs2) of the stabilization compensating sections 241 and 242.

$$C_{sn} = K_{stan} \frac{\frac{1}{2\pi f_{ca}}s}{\frac{1}{2\pi f_{ca}}s+1} \times \frac{\frac{1}{2\pi f_{cb}}s}{\frac{1}{2\pi f_{cb}}s+1}$$ [Expression 6]

Here, $K_{stan}$ is a gain, and fca and fcb are cutoff frequencies.

Figure 20:
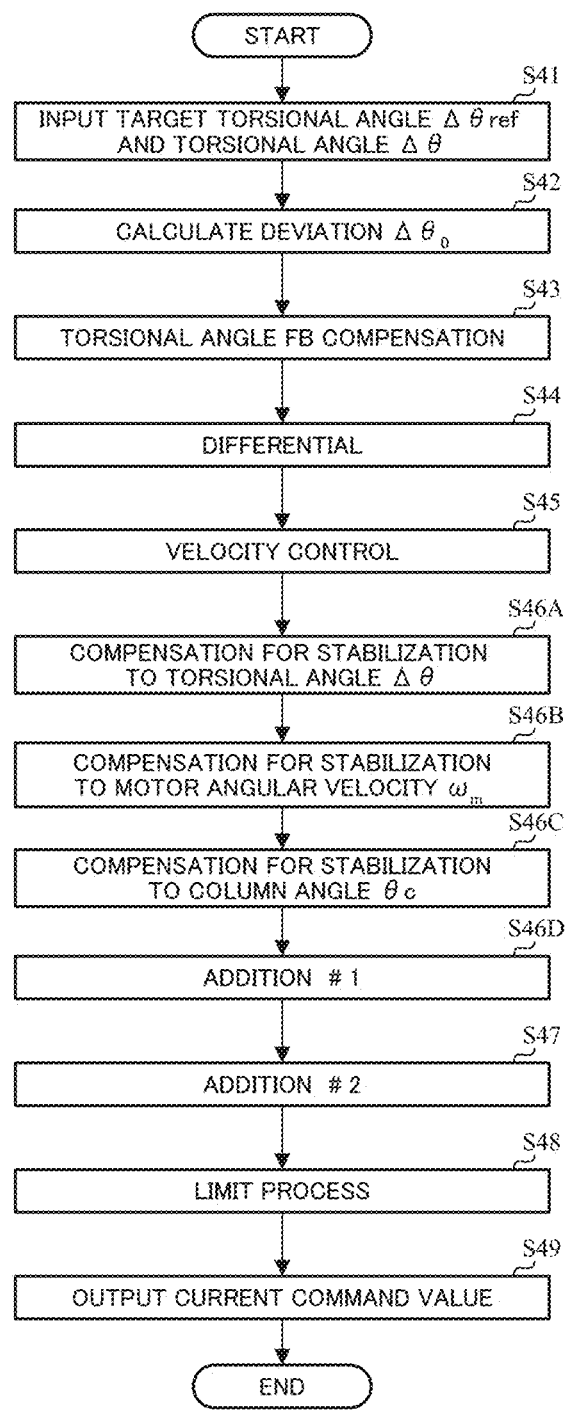
FIG. 20 is a flowchart showing an operating example (the second embodiment) of the torsional angle control section.

In such a configuration, an operating example of the torsional angle control section 240 will be described with reference to a flowchart of FIG. 20.

The operations to the step S45 which are the same as those in the first embodiment are performed.

The stabilization compensating section 241 performs the compensation for the stabilization to the inputted torsional angle Δθ (Step S46A), and the current command value Isb1 from the stabilization compensating section 241 is inputted into the adding section 244. As with the first embodiment, the motor angular velocity m is inputted into the stabilization compensating section 145, the compensation for the stabilization is performed at the stabilization compensating section 145 (Step S46B), and the current command value Isb0 from the stabilization compensating section 145 is inputted into the adding section 243. The column angle θc is inputted into the stabilization compensating section 242, the compensation for the stabilization is performed at the stabilization compensating section 242 (Step S46C), and the current command value Isb2 from the stabilization compensating section 242 is inputted into the adding section 243.

The current command values Isb0, Isb1 and Isb2 are added at the adding sections 243 and 244, and the current command value Isb is calculated (Step S46D). That is, the current command value Isb2 and Isb0 are added at the adding section 243, the current command value Isb1 is added to the added result at the adding section 244, and the added result at the adding section 244 is outputted as the current command value Isb. The current command value Isb is inputted into the adding section 146. The subsequent operations which are the same as those in the first embodiment are performed (Step S47 to Step S49).

The compensation processes for the stabilization are performed by disposing the respective stabilization compensating sections to the torsional angle Δθ, the motor angular velocity $\omega_m$ and the column angle θc in the present embodiment (the second embodiment). From these compensation processes for the stabilization, any one may be suitably selected, and the selected compensation processes for the stabilization may be appropriately combined.

In the above embodiments (the first and second embodiments), the hysteresis correcting section 124 may be sensitive to the vehicle speed V as well as the basic map 121 and the damper gain map 123, and the phase compensating section may be disposed at the subsequent stage or the previous stage of the basic map 121. For example, in the case that a driver desires a comfortable feeling to steering, a phase advance compensation may be set. In the above embodiments, the added result of the torque signals $T_{ref\_a}$, $T_{ref\_b}$ and $T_{ref\_c}$ is set as the target steering torque $T_{ref}$. The torque signal $T_{ref\_a}$ may be set as the target steering torque $T_{ref}$, or the added result of the torque signals $T_{ref\_a}$ and $T_{ref\_c}$ may be set as the target steering torque $T_{ref}$.

A current command value for a conventional assist control, a current command value for a self-aligning torque (SAT) estimation value or a current command value for steering wheel vibration suppression may be added to the current command value $I_{ref}$ of the torsional angle control section.

Further, in the above embodiments, the proportional preceding type PI-control (the I-P control) is used in the velocity control section. A generally used control such as a PI-control, a proportional (P) control, a proportional integral differential (PID) control, a differential preceding type PID control (a PI-D control), a model matching control or a model reference control may be used in the velocity control section.

In the above embodiments, the steering angular velocity is obtained by the differential calculation to the steering angle θh, and an LPF process to the steering angular velocity is appropriately performed in order to reduce an influence of a noise in a high frequency band. A process using a high pass filter (HPF) and a gain may be used instead of the process using the differential calculation and the LPF. Moreover, a signal obtained by differentiating the detected angle @1 of the upper side angle sensor, the detected angle $\theta_2$ of the lower side angle sensor or the detected angle of the rotational angle sensor connected to the motor, instead of the steering angle θh, and performing the LPF process to the differentiated result, may be used as the steering angular velocity.

EXPLANATION OF REFERENCE NUMERALS

1 steering wheel
2 column shaft (steering shaft, handle shaft)
3 reduction mechanism
10 torque sensor
12 vehicle speed sensor
14 steering angle sensor
20 motor
30 control unit (ECU)
100, 200 EPS steering system/vehicle system
101 converting section
110 right-turning/left-turning judging section
120 target steering torque generating section
121 basic map
123 damper gain map
124 hysteresis correcting section
130 velocity control section
140, 240 torsional angle control section
142 torsional angle feedback (FB) compensating section
145, 241, 242 stabilization compensating section

The invention claimed is:

1. An electric power steering apparatus that comprises a torsion bar which is provided in a column shaft of a steering wheel of a vehicle, and assist-controls a steering system by driving and controlling a motor connected to said column shaft based on a current command value, the electric power steering apparatus comprising:
at least one hardware processor configured to implement:
generating a target steering torque reference based on vehicle driving information;
converting said target steering torque reference into a target torsional angle reference, using a spring constant of said torsion bar;
calculating said current command value based on at least said target torsional angle reference and a torsional angle value of said torsion bar;
inputting a steering state which indicates right-turning or left-turning of said steering wheel;
outputting, via a basic map, a first torque signal being vehicle speed sensitive, depending on said vehicle driving information;
performing hysteresis correction corresponding to said vehicle driving information depending on said steering state and output a second torque signal;
outputting a third torque signal obtained by multiplying a differential value of said vehicle driving information by a vehicle speed sensitive damper gain;
outputting said target steering torque reference by adding said second torque signal and said third torque signal to said first torque signal;
outputting a target torsional angular velocity value corresponding to a deviation between said target torsional angle reference and said torsional angle value;
inputting said target torsional angular velocity value and a torsional angular velocity value;
calculating and outputting said current command value so that said torsional angular velocity value follows said target torsional angular velocity value;
performing feedback to said current command value by setting a transfer function to at least one of angle relation information; and
performing a control so that said torsional angle value follows a value depending on said vehicle driving information.

2. The electric power steering apparatus according to claim 1, wherein said angle relation information includes at least one of a motor angular velocity value, said torsional angle value, and a column angle value.

3. The electric power steering apparatus according to claim 2, wherein said transfer function to said motor angular velocity value is set by a primary high pass filter (HPF) and a gain.

4. The electric power steering apparatus according to claim 3, wherein the at least one hardware processor is further configured to limit upper and lower limit values.

5. The electric power steering apparatus according to claim 3, wherein the at least one hardware processor is further configured to implement applying a gain value of a second transfer function.

6. The electric power steering apparatus according to claim 3, wherein said vehicle driving information includes a steering angle value, a vehicle speed value and a steering state value.

7. The electric power steering apparatus according to claim 2, wherein said transfer function to said torsional angle value and to said column angle value are set by a second or higher order filter.

8. The electric power steering apparatus according to claim 7, wherein the at least one hardware processor is further configured to limit upper and lower limit values.

9. The electric power steering apparatus according to claim 7, wherein the at least one hardware processor is further configured to implement applying a gain value of a second transfer function.

10. The electric power steering apparatus according to claim 7, wherein said vehicle driving information includes a steering angle value, a vehicle speed value and a steering state value.

11. The electric power steering apparatus according to claim 2, wherein the at least one hardware processor is further configured to limit upper and lower limit values.

12. The electric power steering apparatus according to claim 2, wherein the at least one hardware processor is further configured to implement applying a gain value of a second transfer function.

13. The electric power steering apparatus according to claim 2, wherein said vehicle driving information includes a steering angle value, a vehicle speed value and a steering state value.

14. The electric power steering apparatus according to claim 1, wherein the at least one hardware processor is further configured to limit upper and lower limit values.

15. The electric power steering apparatus according to claim 14, wherein the at least one hardware processor is further configured to implement applying a gain value of a second transfer function.

16. The electric power steering apparatus according to claim 14, wherein said vehicle driving information includes a steering angle value, a vehicle speed value and a steering state value.

17. The electric power steering apparatus according to claim 1, wherein the at least one hardware processor is further configured to implement applying a gain value of a second transfer function.

18. The electric power steering apparatus according to claim 17, wherein said vehicle driving information includes a steering angle value, a vehicle speed value and a steering state value.

19. The electric power steering apparatus according to claim 1, wherein said vehicle driving information includes a steering angle value, a vehicle speed value and a steering state value.

20. The electric power steering apparatus according to claim 1, wherein the at least one hardware processor is further configured to implement controlling driving the motor connected to said column shaft based on the current command value.

21. The electric power steering apparatus according to claim 1, wherein said at least one angle relation information includes a motor angular velocity value.

22. The electric power steering apparatus according to claim 1, wherein said transfer function to said motor angular velocity value is set by a primary high pass filter (HPF) and a gain.

* * * * *